United States Patent
Perichon et al.

(10) Patent No.: US 10,172,201 B2
(45) Date of Patent: Jan. 1, 2019

(54) ELECTRONIC CONVERTER AND LIGHTING SYSTEM COMPRISING SUCH A CONVERTER

(71) Applicant: COMMISSARIAT A L'ENERGIE ATOMIQUE ET AUX ENERGIES ALTERNATIVES, Paris (FR)

(72) Inventors: Pierre Perichon, Voiron (FR); Othman Ladhari, Fontaine (FR); Léo Sterna, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 15/757,222

(22) PCT Filed: Aug. 30, 2016

(86) PCT No.: PCT/EP2016/070395
§ 371 (c)(1),
(2) Date: Mar. 2, 2018

(87) PCT Pub. No.: WO2017/037050
PCT Pub. Date: Mar. 9, 2017

(65) Prior Publication Data
US 2018/0263090 A1 Sep. 13, 2018

(30) Foreign Application Priority Data
Sep. 4, 2015 (FR) .................................... 15 58237

(51) Int. Cl.
*H05B 37/02* (2006.01)
*H05B 33/08* (2006.01)
(Continued)

(52) U.S. Cl.
CPC ........ *H05B 33/0818* (2013.01); *H02M 1/081* (2013.01); *H02M 7/217* (2013.01);
(Continued)

(58) Field of Classification Search
CPC ..................... H05B 33/0842; H05B 33/0845
(Continued)

(56) References Cited

U.S. PATENT DOCUMENTS 5,598,326 A * 1/1997 Liu ..................... H02M 1/4241
363/132
8,076,920 B1 12/2011 Melanson
(Continued)

FOREIGN PATENT DOCUMENTS

CN 202535597 U 11/2012
WO WO 2008/044120 A2 4/2008
(Continued)

OTHER PUBLICATIONS

International Search Report as issued in International Patent Application No. PCT/EP2016/070395, dated Nov. 24, 2016.
(Continued)

*Primary Examiner* — Thuy Vinh Tran
(74) *Attorney, Agent, or Firm* — Pillsbury Winthrop Shaw Pittman LLP

(57) ABSTRACT

An electronic converter allows a power transfer from an AC voltage source, connected between an input terminal and a common terminal, to a load connected between an output terminal and a reference terminal, the AC voltage including positive alternations interspersed with negative alternations at a first frequency. The converter includes an input inductance connected to the input terminal; an output inductance connected to the output terminal; a storage capacitor between the inductances; a chopper circuit that: in a first state, charges the input inductance via the AC voltage source
(Continued)

and discharges the storage capacitance in the output inductance by supplying the load; in a second state, discharges the input inductance in the storage capacitance and discharges the output inductance by supplying the load; and a device for controlling the chopper circuit to activate, during each alternations, consecutive operating cycles at a second frequency higher than the first frequency.

17 Claims, 6 Drawing Sheets

(51) Int. Cl.
- *H02M 1/08* (2006.01)
- *H02M 7/217* (2006.01)
- *H02M 1/00* (2006.01)

(52) U.S. Cl.
CPC .. *H05B 33/0845* (2013.01); *H02M 2001/0054* (2013.01); *H05B 33/0842* (2013.01)

(58) Field of Classification Search
USPC .................................. 315/209 R, 283, 291
See application file for complete search history.

(56) References Cited

U.S. PATENT DOCUMENTS

| | | | |
|---|---|---|---|
| 2012/0104972 A1 | 5/2012 | Taubert | |
| 2012/0319604 A1* | 12/2012 | Walters | H02M 3/1582 |
| | | | 315/200 R |
| 2016/0322910 A1* | 11/2016 | Kovacevic | H02M 3/33576 |

FOREIGN PATENT DOCUMENTS

| | | |
|---|---|---|
| WO | WO 2012/172472 A1 | 12/2012 |
| WO | WO 2014/009836 A2 | 1/2014 |
| WO | WO 2014/108964 A1 | 7/2014 |

OTHER PUBLICATIONS

Search Report as issued in French Patent Application No. 1558237, dated Jul. 20, 2016.

Cuk, S., et al., "98% Efficient Single-Stage AC/DC Converter Topologies," Power Converters, Issue 4, 2011, 6 pages.

* cited by examiner

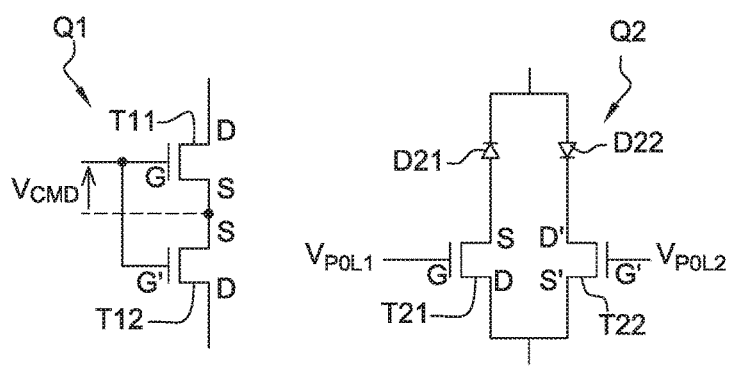
Fig. 6A   Fig. 6B
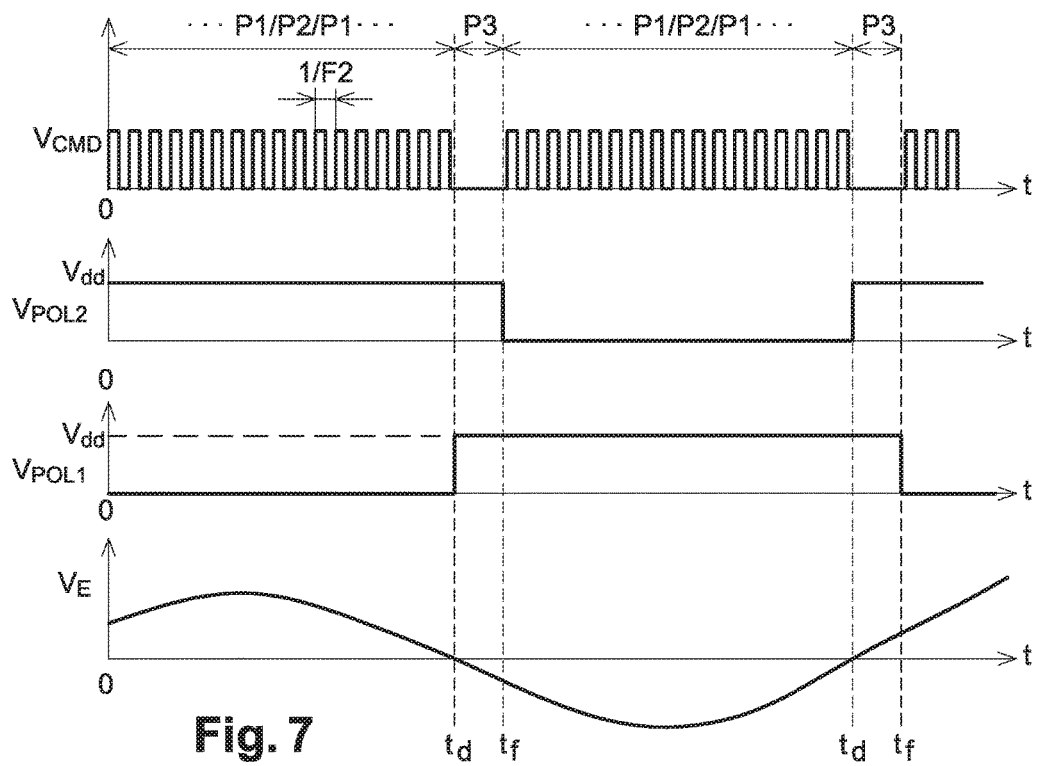
Fig. 7

US 10,172,201 B2

ELECTRONIC CONVERTER AND LIGHTING SYSTEM COMPRISING SUCH A CONVERTER

CROSS-REFERENCE TO RELATED APPLICATIONS

This is the U.S. National Stage of PCT/EP2016/070395, filed Aug. 30, 2016, which in turn claims priority to French Application No. 1558237, filed Sep. 4, 2015, the entire contents of all applications are incorporated herein by reference in their entireties.

TECHNICAL FIELD

The present invention relates to an electronic converter which has a particularly advantageous application in lighting systems powered by direct current, such as a light-emitting diode lamp.

STATE OF THE ART

In the lighting field, light-emitting diode (LED) lamps are increasingly replacing halogen incandescent lamps and fluorescent lamps, due to their lower electrical consumption and longer lifetime. LED lamps cannot, however, operate at mains voltage, i.e. using the alternating current supplied by the electrical distribution network, unlike the other two lamp technologies. They must, indeed, be powered by direct current (DC).

To this end, an electronic circuit commonly called a driver is placed between the electrical network and the load of the lamp, consisting of one or more LEDs. The driver's main function is to convert the alternating voltage of the electrical network into a direct current to power the LEDs. The driver also protects the LEDs against network spikes, by regulating the electrical current in the LEDs. It generally takes the form of an electronic card integrated in the base of the bulb, or offset in an external case.

The driver is subject to many stresses. In addition to a satisfactory conversion efficiency, the driver must have a lifetime at least equal to that of the LEDs. It must also limit the flicker effect of the LEDs, i.e. the luminous flux fluctuations, since this effect causes substantial visual discomfort. This requires great stability in the current of the LEDs. Finally, it must be compact in order to be integrated in the base of the bulb.

FIG. 1 is an electrical diagram of a traditional LED driver 10. This driver 10 comprises several successive conversion stages:
- an AC-DC converter 11 formed of a diode bridge rectifier, enabling a substantially direct voltage to be generated from an alternating input voltage $V_{AC}$;
- a voltage doubler 12, whether or not wired, depending on the alternating input voltage $V_{AC}$ (for example, 115 V or 230 V);
- a DC-DC step-down voltage converter 13 comprising a diode D, a storage coil L and a MOSFET transistor Q driven by a controller 14; and
- a filter capacitor 15 connected in parallel to the LEDs 20.

Filter capacitor 15, of the electrolytic type, "smoothes" the voltage at the terminals of the LEDs 20, to reduce the current variations which cause the flicker effect. This capacitor is essential since LEDs, unlike other light sources, have very low remanence. The luminous flux produced by LEDs is not therefore intrinsically smoothed.

The passive components used in this driver have high values, in particular coil L (typically 2 mH), capacitor 15 (4.7 µF) and the capacitors belonging to voltage doubler 12 (68 µF). They are consequently bulky, and occupy a large space on the electronic card, making it difficult to integrate driver 10 into the base of a bulb.

Besides, since the conversion efficiency of this circuit is reduced by the large number of conversion stages, driver 10 dissipates a non-negligible quantity of energy, and tends to become hot. When the driver is moreover integrated, the temperature increase is accentuated by the immediate proximity of the LEDs and it becomes difficult to cool it due to the lack of space in the base of the bulb. The passive components then operate at a high temperature, and age more rapidly, in particular electrolytic capacitor 15.

Driver 10 represented in FIG. 1 is thus bulky and unreliable. Its lifetime is often shorter than that of the LEDs 20, meaning that it must be replaced.

FIG. 2 shows the electrical diagram of a DC-DC converter which is also known: the "Ćuk" converter. This type of converter is used to power a bipolar load 12 with direct current from a voltage source 22, which is also direct. Its distinctive feature is that it supplies at the output, i.e. at the terminals of load 21, a direct voltage Vs which is lower or higher than the input voltage Ve supplied by source 22.

This converter comprises an input inductor L1 connected to first terminal E of direct voltage source 22, an output inductor L2 connected to a first terminal S of load 21 and a storage capacitor C connected between inductors L1-L2. Load 21 and voltage source 22 are connected directly through their second terminal.

The Ćuk converter also comprises a switch Q', in general a power MOSFET transistor, a diode D' and smoothing capacitor C'. Switch Q' comprises a first end connected between input inductor L1 and storage capacitor C, and a second end connected to the second terminals of load 21 and of voltage source 22. The anode of diode D' is connected between storage capacitor C and output inductor L2, while its cathode is connected to the second terminals of load 21 and of voltage source 22. Finally, smoothing capacitor C' is connected in parallel to load 21.

The Ćuk converter operates as follows.

During a first phase of operation φ1, switch Q' is closed and diode D', which is reverse-biased due to previously charged capacitor C, is blocked. Voltage source 22 charges input inductor L1. Simultaneously, capacitor C is discharged through switch Q', load 21 and inductor L2, which charges. Thus, during this first phase, input inductor L1 is charged, and the charge of storage capacitor C is transferred to output inductor L2.

During a second phase of operation φ2, switch Q' is open and diode D' is now in the on-state. The charge of input inductor L1 is transferred to storage capacitor C and output inductor L2 is discharged through diode D', powering load 21.

Phases φ1 and φ2 thus succeed one another in a cyclical manner, at the rate determined by the command of switch Q'. The command of switch Q' determines the converters characteristics, whether step-down or step-up. Indeed, the value of output voltage $V_S$ may be adjusted by modifying the duty cycle, i.e. the duration of the first operational phase divided by the total duration of a cycle.

The Ćuk converter is a DC-DC converter. It cannot therefore act as an interface between an alternating voltage source (AC) and a load consisting of LEDs, such as the driver of FIG. 1.

SUMMARY OF THE INVENTION

There is a need to provide a compact and reliable electronic converter, capable of powering with a direct current a load connected between an output terminal and a reference terminal of the converter, from an alternating voltage source connected between an input terminal and a common terminal of the converter.

According to a first aspect of the invention, this need tends to be satisfied by providing an electronic converter comprising the following elements:
- an input inductor having a first end connected to the input terminal so as to receive the alternating voltage;
- an output inductor connected to the output terminal;
- a storage capacitor arranged between the input inductor and the output inductor;
- a chopper circuit configured:
  - in a first operating state, to charge the input inductor by means of the alternating voltage source, and to discharge the storage capacitor into the output inductor while powering the load;
  - in a second operating state, to discharge the input inductor into the storage capacitor, and to discharge the output inductor while powering the load;
- the chopper circuit comprising a first voltage and current bidirectional switch having a first end connected to a second end of the input inductor, and a second end connected to the common terminal; and
- a device for controlling the chopper circuit, configured to activate, during each positive and negative alternation, successive operating cycles at a second frequency higher than the frequency of the alternating voltage, each operating cycle consisting of the first operating state and of the second operating state, the first operating state having a duty cycle which varies so as to obtain a constant output voltage between the output terminal and the reference terminal during each positive and negative alternation.

Given its composition and its two high-frequency operating phases, the electronic converter according to the invention resembles a conventional Ćuk-type converter. However, unlike it, it matches at input with an alternating voltage source (AC), for example the electrical distribution network. By varying the duration of the first operating phase during the successive operating cycles (otherwise known as the duty cycle), compensation can be made for the variations of the alternating input voltage to provide, on each alternation of the input voltage, a constant voltage at the output. The electronic converter thus has, at times, step-up characteristics, and at other times step-down characteristics, depending on whether the input alternating voltage is less or greater than the desired voltage level at output.

Due to this particular control of the chopper circuit, the current which flows in the load is stable on each alternation of the input voltage. For this reason, the converter according to the invention is perfectly suited to powering one or more light-emitting diodes (LED). It enables the flicker effect of the LEDs to be minimised, and can thus form an efficient LED lamp driver.

It is no longer essential to produce a high-value filter capacitor to smoothe the current variations, since this smoothing effect is directly obtained by controlling the chopper circuit. In addition, since this converter switches at a frequency (called the "chopping frequency") which is much higher than the frequency of the alternating voltage, the passive components which it contains can be of low value and therefore small in size. This enables the converter to be integrated into small spaces such as the base of a bulb.

In addition to being compact, the converter according to the invention has a higher efficiency that that of the AC-DC converters of the prior art. This is due to the fact that there is only a single conversion stage. In particular the diode bridge rectifier, which is the cause of substantial losses in the circuits of the prior art, is eliminated. The losses in the passive components, which are fewer in number and which have lower values, are low, and the active components belonging to the chopper circuit is dissipate little energy when they switch. Consequently, the converter does not get very hot, and it has a long lifetime.

Advantageously, the chopper circuit is further configured to connect the input inductor and the storage capacitor in series with the alternating voltage source in a third operating state, and the control device is further configured to activate the third operating state at each transition between the positive and negative alternations. This third operating state enables the voltage to be reversed at the terminals of the storage capacitor when the alternating voltage changes sign. By this means the risk of voltage spikes and electrical losses in the electronic converter is reduced.

The third operating state preferably starts roughly at a first instant when the alternating current changes to zero, and ends at a second instant when the voltage measured at the terminals of the storage capacitor reaches a value of opposite sign to the one measured at the first instant. The voltage at the storage capacitors terminals can be measured by the control device of the chopper circuit.

According to a first embodiment of the converter according to the invention, the second end of the input inductor is connected to a first electrode of the storage capacitor, the output inductor comprises a first end and a second end connected to the output terminal, and the chopper circuit further comprises a Graetz-type controlled bridge rectifier having an input connected between a second electrode of the storage capacitor and the common terminal, and an output connected between the reference terminal and the first end of the output inductor.

The load associated with this first embodiment of the converter is advantageously provided with a series of LEDs, the output terminal of the converter forming a point where the current enters into the series of LEDs.

The Graetz-type controlled bridge rectifier preferably comprises four components, including at least two transistors, advantageously gallium nitride HEMTs. It comprises, for example:
- a first diode having a cathode connected to the second electrode of the storage capacitor, and an anode connected to the reference terminal;
- a first transistor having a first end connected to the reference terminal and a second end connected to the common terminal;
- a second diode having an anode connected to the second electrode of the storage capacitor, and a cathode connected to the first end of the output inductor; and
- a second transistor having a first end connected to the first end of the output inductor, and a second end connected to the common terminal.

According to a second embodiment of the converter according to the invention, the reference terminal is connected to the common terminal, the second end of the input inductor is connected to a first electrode of the storage capacitor, and the output inductor comprises a first end connected to a second electrode of the storage capacitor and a second end connected to the output terminal, and the chopper circuit further comprises a second bidirectional switch having a first end connected to the first end of the output inductor, and a second end connected to the common terminal.

The load associated with this second embodiment of the converter advantageously consists of two series of LEDs connected in antiparallel.

The converter according to the invention may also have one or more of the characteristics below, considered individually, or in all technically possible combinations:
- the control device is configured to make the duty cycle vary according to variation directions identical to those of the alternation voltage during each negative alternation and according to variation directions opposite to those of the alternating voltage during each positive alternation;
- the control device is configured to make the duty cycle vary periodically at a third frequency equal to twice the first frequency;
- the first bidirectional switch is made to open and close in succession by the control device during each of the positive and negative alternations;
- the first bidirectional switch is made to open by the control device at each transition between the positive and negative alternations;
- the first transistor of the Graetz-type controlled bridge rectifier is made to open by the control device during each of the positive alternations, and made to close during each of the negative alternations;
- the second transistor of the Graetz-type controlled bridge rectifier is made to close by the control device during each of the positive alternations, and made to open during each of the negative alternations;
- the second bidirectional switch is configured to switch spontaneously between opening and closing during each of the positive and negative alternations;
- the second bidirectional switch is made to close by the control device at each transition between the positive and negative alternations;
- the first bidirectional switch comprises first and second transistors mounted in series back-to-back and controlled by a single signal from the control device;
- the first and second transistors of the first bidirectional switch are gallium nitride HEMTs,
- the second bidirectional switch comprises first and second branches connected in parallel, the first branch comprising a first transistor and a first diode connected in series, the second branch comprising a second transistor and a second diode connected in series, the first and second diodes being mounted in opposite directions; and
- the first and second transistors of the second bidirectional switch are gallium nitride HEMTs.

A second aspect of the invention concerns a lighting system comprising the electronic converter according to the invention and a load provided with at least one LED, the load being connected between the output terminal and the reference terminal of the electronic converter.

BRIEF DESCRIPTION OF THE FIGURES

Other characteristics and advantages of the invention will become clear from the description which is given of it below, by way of example and non-restrictively, with reference to the appended figures, in which:

FIG. 6A represents an exemplary embodiment of a first bidirectional switch belonging to the electronic converter of FIG. 3;

FIG. 6B represents an preferential embodiment of a second bidirectional switch belonging to the electronic converter of FIG. 3;

FIG. 7 is a chronogram representing the control of the bidirectional switches of FIGS. 6A and 6B, during a positive alternation and during a negative alternation of the input voltage;

For greater clarity, identical or similar elements are identified by identical reference signs in all the figures.

DETAILED DESCRIPTION OF AT LEAST ONE EMBODIMENT

Figure 3:
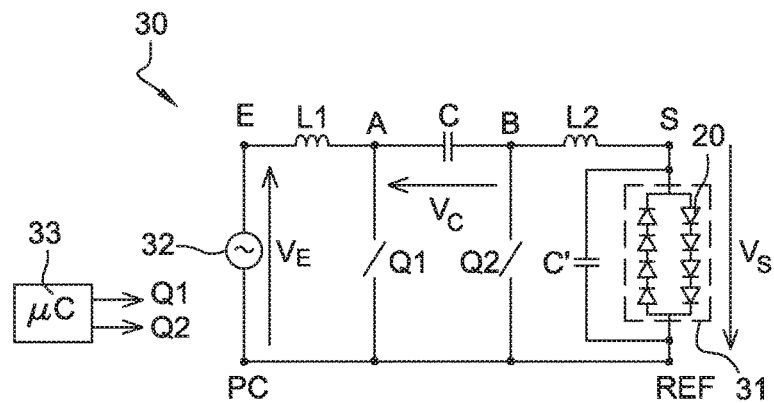
FIG. 3 schematically represents a first embodiment of an AC-DC electronic converter according to the invention.

FIG. 3 shows the electrical diagram of an electronic converter 30 according to a first embodiment of the invention. This converter 30 enables a bidirectional load 31 to be powered from an alternating voltage (AC) source 32.

Bidirectional load 31 is connected between an output terminal S and a reference terminal REF of converter 30. It comprises, for example, two branches connected in parallel, each branch comprising a plurality of LEDs 20 connected in series. In each branch all the LEDs 20 are oriented in the same direction. The load is said to be bidirectional, since currents of opposite directions traverse both branches (in succession). In other words, both series of LEDs are mounted in antiparallel. Both branches of bidirectional load 31 preferably contain the same number of LEDs and have the same light output.

The alternating voltage source 32, for example an electrical distribution network within an individual home, is connected between an input terminal E and a common terminal PC of converter 30. Common terminal PC, also called the common point, acts as a reference for several components of converter 30 described below. In addition, in this embodiment of the converter, the terminal REF (to which load 31 is connected) and terminal PC (to which source 32 is connected) are connected electrically, such that the same potential is applied to them. Alternating voltage $V_E$ supplied by source 32 is preferably a sinusoidal voltage. As an example, its frequency is 50 Hz and its amplitude is 325 V (230 V as a root mean square value).

Converter 30 comprises an input inductor L1 connected to voltage source 32, an output inductor L2 connected to load 31 and a storage capacitor C connected between inductors L1 and L2. More particularly, input inductor L1 comprises a first end connected to input terminal E of the converter, so as to receive the input alternating voltage, and a second end connected to a first electrode of capacitor C. Output inductor L2 comprises a first end connected to a second electrode of capacitor C and a second end connected to output terminal S of the converter. If only these first three elements are considered, therefore, input inductor L1, capacitor C and output inductor L2 are connected in series between input terminal E and output terminal S.

Converter 30 also comprises two voltage and current bidirectional switches Q1 and Q2. First bidirectional switch Q1 comprises a first end connected to a point A located between input inductor L1 and storage capacitor C, and a second end connected to common terminal PC of the converter. Point A is thus, in the electrical diagram of FIG. 3, a node where the second end of input inductor L1, the first electrode of capacitor C and the first end of switch Q1 are joined. Second bidirectional switch Q2 comprises a first end connected to a point B located between storage capacitor C and output inductor L2, and a second end also connected to common terminal PC. Point B is therefore a node where the second electrode of capacitor C, the first end of output inductor L2 and the first end of switch Q2 are joined.

Like all switches, each of bidirectional switches Q1 or Q2 can switch between an on-state, in which the voltage at its terminals is zero, and an off-state, in which no current traverses the switch. A switch is said to be voltage and current bidirectional when it can withstand positive and negative voltages in the off-state and conduct positive and negative currents in the on-state. Another term used is "four-quadrant switch".

Switches Q1 and Q2 constitute a chopper circuit, which cuts or "chops" input alternating voltage $V_E$ at a fixed frequency, called the chopping frequency. They are made to open and close in succession, i.e. to be in the off-state and in the on-state respectively, by a control device 33, for example a microcontroller.

Switches Q1 and Q2 of converter 30 are constantly controlled in a complementary manner, i.e. in antiphase. When switch Q1 is open switch Q2 is closed, and vice versa. Two operating phases of the converter are then distinguished, corresponding to two separate states of the chopper circuit.

Figure 4A:
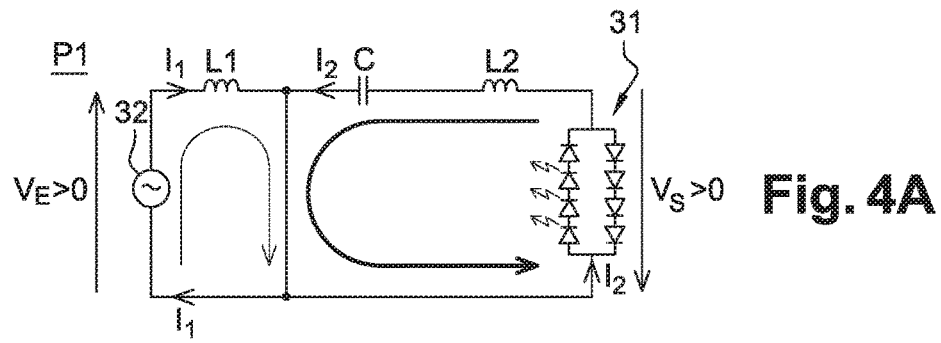
FIGS. 4A and 4B represent two operating phases of the electronic converter according to FIG. 3.
Figure 4B:
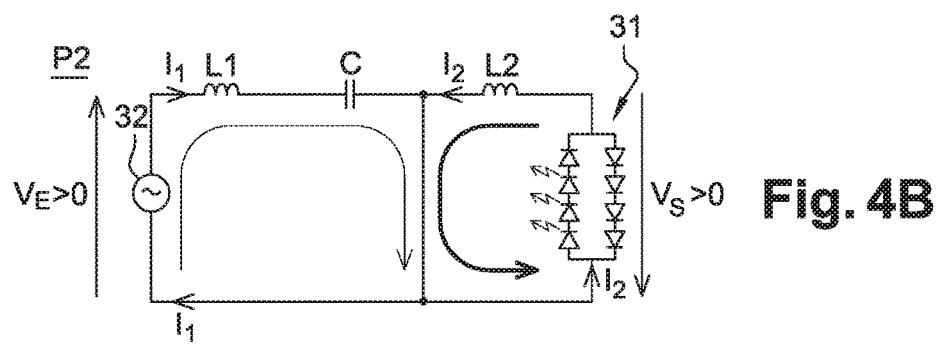

FIGS. 4A and 4B schematically represent these two operating phases P1 and P2.

During first operating phase P1, represented in FIG. 4A, first bidirectional switch Q1 is closed (it is therefore equivalent to a wire) and second bidirectional switch Q2 is open (it is therefore equivalent to an open circuit). This results in input inductor L1 being connected in series with alternating voltage source 32. A current $I_1$ from source 32 then traverses input inductor L1 and stores the energy (in magnetic form). Storage capacitor C is also connected in series with load 31 and output inductor L2. Previously charged capacitor C discharges into output inductor L2, generating a current $I_2$ which powers load 31.

In second operating phase P2 (FIG. 4B), the configuration of bidirectional switches Q1 and Q2 is reversed. First switch Q1 is open and second switch Q2 is closed. By this means a first loop is formed in which current $I_1$ from source 32 traverses input inductor L1 and storage capacitor C and the charge of input inductor L1 is transferred into capacitor C. In a second loop, output inductor L2 is connected in series with load 31. It discharges, producing current $I_2$ which powers the load.

It can be seen that, during each of these phases P1-P2, current $I_2$ flows in a single branch of load 31. When alternating input voltage $V_E$ is positive, i.e. during a positive alternation, current $I_1$ flows in a clockwise direction, and current $I_2$ flows in an anticlockwise direction, as illustrated in FIGS. 4A and 4B. The series of LEDs on the left is therefore powered. During a negative alternation of input voltage $V_E$ ($V_E$<0), currents $I_1$ and $I_2$ flow in the other direction, respectively anticlockwise and clockwise. Current $I_2$ then traverses the series of LEDs on the right in FIGS. 4A and 4B.

Operating phases P1 and P2 constitute a chopping cycle which is reproduced periodically on each alternation of input voltage $V_E$, whether positive or negative. The duration of a cycle, which corresponds to the period, is equal to the sum of the durations of phases P1 and P2.

The applied chopping therefore enables the electrical energy to be transferred from voltage source 32 to load 31 in two phases, firstly from input inductor L1 to storage capacitor C, and then from storage capacitor C to output inductor L2. The chopping frequency, i.e. the frequency of the chopping cycles, is preferably higher than 10 MHz, for example 50 MHz. This high frequency enables the volume occupied by inductors L1-L2 and capacitor C to be reduced, by choosing low values for them, of the order of 1 µH (L1=L2) and 160 pF (at 50 MHz) respectively. Converter 30 can thus be sufficiently compact to be integrated in the base of an LED bulb.

The quantity of electrical energy transferred from voltage source 32 to load 31 varies according to the duration of first operating phase P1 in the cycle, and therefore of the duty cycle associated with this phase. Duty cycle α of first operating phase P1 refers to the ratio of the duration of phase P1 over the total duration of a cycle. This duty cycle determines the relationship between input voltage $V_E$ and output voltage $V_S$ of converter 30, in other words whether it has voltage step-down or step-up characteristics. It is written as follows:

$$\alpha = \frac{T_{P1}}{T_{P1} + T_{P2}} = \frac{1}{1 + \left|\frac{V_E}{V_S}\right|} \quad (1)$$

where $T_{P1}$ is the duration of first phase P1 and $T_{P2}$ the duration of second phase P2.

To prevent the LED flicker effect, and the visual discomfort which it causes, it is desirable that converter 30 should be able to supply currents $I_2$ of the same intensity in both arms of bidirectional load 31, and that this intensity should be constant during each positive or negative alternation of input voltage $V_E$. This implies a continuous voltage $V_S$ at the terminals of load 31 during each alternation. To attain this goal it is necessary, according to relationship (1) above, to make duty cycle α vary in a certain fashion, according to input voltage $V_E$.

Thus, in converter 30 of FIG. 3, command device 33 of bidirectional switches Q1-Q2 is configured to modify duty cycle α according to input alternating voltage $V_E$, so as to obtain at the output of the converter a voltage $V_S$ which is constant during each of the positive and negative alternations, whatever input voltage level $V_E$ may be. The modification of duty cycle α according to input alternating voltage $V_E$ enables a direct AC-DC conversion to be obtained, during each of the positive and negative alternations, solely through the energy transfers between inductors L1-L2 and storage capacitor C. These energy transfers cause only small losses, and this is the reason why converter 30 has a better efficiency than that of conventional converters with a voltage rectifier stage (in addition to a voltage step-down stage).

Figure 5:
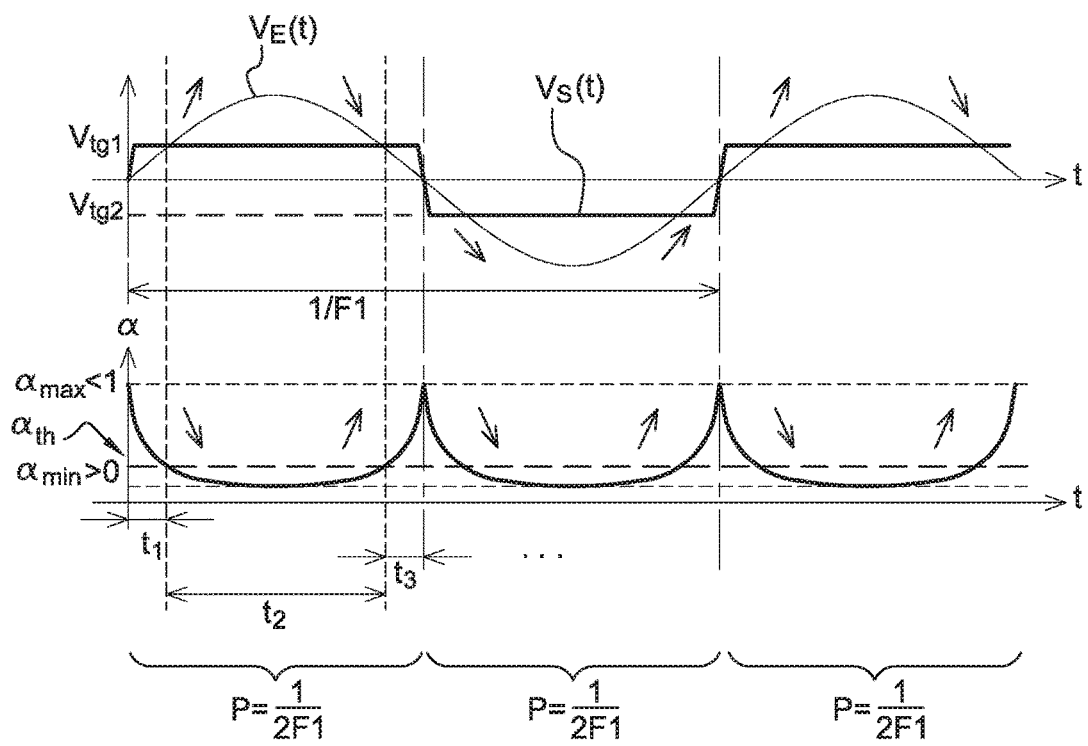
FIG. 5 is a chronogram representing input and output signals of the electronic converter according to FIG. 3.

FIG. 5 illustrates this particular modification of duty cycle α, by chronograms of input alternating voltage $V_E$, output voltage $V_S$ and duty cycle α (as defined by relationship (1) above).

As previously described, current $I_2$ flowing in bidirectional charge 31 changes direction according to the sign of input voltage $V_E$. Output voltage $V_S$ therefore alternates between a positive target value $V_{tg1}$ during positive alternations of input voltage $V_E$ and a negative target value $V_{tg2}$ during negative alternations of input voltage $V_E$. Target values $V_{tg1}$ and $V_{tg2}$ of the output voltage are therefore between the maximum and minimum values of input alternating voltage $V_E$.

In one preferential embodiment of the converter, intended for example for a system of lighting by LEDs, target values $V_{tg1}$ and $V_{tg2}$ of the output voltage are equal in absolute value terms. Duty cycle α is then a periodic signal with a frequency twice as high as frequency F1 of input alternating voltage $V_E$. In other words, an alternation of the input voltage, whether positive or negative, corresponds to each period P of duty cycle α.

Unlike input voltage $V_E$, duty cycle α does not alternate between positive values and negative values. It changes between a minimum value $α_{min}$ and a maximum value $α_{max}$, where both these values are between 0 and 1 ($α_{min} < α_{max}$). The duty cycle has a threshold value $α_{th}$ representing the limit between the voltage step-up and step-down characteristics of converter 30. A value lower than threshold $α_{th}$ ($α_{min} < α_{th} < α_{max}$) means that the converter has characteristics of the voltage step-down type, whereas a value higher than threshold am implies characteristics of the voltage step-up type. In addition, the closer the value of duty cycle α to threshold $α_{th}$, the less substantially the voltage is stepped down or stepped up.

As illustrated in FIG. 5, duty cycle α takes values which are sometimes higher than threshold $α_{th}$, and sometimes lower. This enables the converter to compensate continuously for the variations of input voltage $V_E$ relative to target values $V_{tg1}$-$V_{tg2}$ of the output voltage. The converter then has either voltage step-up characteristics, or voltage step-down characteristics, depending on the value of input voltage $V_E$.

Each period P of duty cycle α can be broken down into three time intervals, $t_1$ to $t_3$. During time interval $t_1$, input voltage $V_E$ is (as an absolute value) less than voltage level $V_{tg1}$/$V_{tg2}$ (depending on the alternation in question) sought at the output. Duty cycle α then takes a value corresponding to voltage step-up characteristics ($α > α_{th}$). Bearing in mind that the difference between input voltage $V_E$ and output level $V_{tg1}$/$V_{tg2}$ tends to decrease during time interval $t_1$, duty cycle α decreases, approaching threshold am. When, at the start of time interval $t_2$, input voltage $V_E$ becomes higher (as an absolute value) than voltage level $V_{tg1}$/$V_{tg2}$, duty cycle α decreases below voltage threshold am in order to operate in step-down mode. In the middle of period P, minimum value $α_{min}$ of the duty cycle is reached, since the difference between voltages $V_E$ and $V_S$ is at its maximum. After this, as the difference decreases, duty cycle α increases until it goes above threshold $α_{th}$. During time interval $t_3$, indeed, input voltage $V_E$ is once again less than voltage level $V_{tg1}$/$V_{tg2}$. Duty cycle α regains its maximum and initial value $α_{max}$, when input voltage $V_E$ becomes zero again.

FIG. 5 shows that duty cycle α modified in this manner has variation directions opposite to those of input voltage $V_E$ on each positive alternation, and variation directions identical to those of input voltage $V_E$ on each negative alternation. In other words, duty cycle α changes in antiphase with input voltage $V_E$ during each positive alternation, and in phase with input voltage $V_E$ during each negative alternation.

Immediately before and immediately after each transition between a positive alternation and a negative alternation of input voltage $V_E$, i.e. at the very end and very start of a period P, the gradient of duty cycle α is advantageously greater than in the middle of period P in order that output voltage $V_S$ changes more rapidly from level $V_{tg1}$ to level $V_{tg2}$, or vice versa. The duration of the transition between the two branches of the bidirectional load is thus reduced, i.e. the time taken by current $I_2$ to be reversed. In addition, when the converter starts, the initial value of duty cycle α can be equal to 1, and therefore higher than the values obtained subsequently at the end of each period P, thereby providing the energy required for the energy transfers.

The electronic converter according to the invention can also be suitable for other applications than lighting with a constant level of luminosity. Indeed, by varying minimum value $α_{min}$ and/or maximum value $α_{max}$ of duty cycle α with each period of input voltage $V_E$, different values of voltage $V_S$ can be obtained at output, and therefore different levels of current in the load. Duty cycle α can then have a frequency equal to the frequency of input voltage $V_E$, or not be periodic if the chosen voltage levels are constantly modified. As an example, the converter can act as a speed variator for a single-phase asynchronous motor.

Duty cycle α can also vary at higher frequencies, in particular due to the instability of the input voltage (particularly in the case of an electrical distribution network), or the instability of the load.

During each of the positive and negative alternations of input voltage $V_E$, the successive chopping cycles (operating phases P1-P2) are generated by activating bidirectional switches Q1 and Q2 in complementary fashion. But perfect complementarity between bidirectional switches Q1-Q2 is difficult to attain if both switches are identical and controlled in the same manner. It can happen, for example, during short instants called "dead times", that both switches Q1-Q2 are open simultaneously. These dead times are prejudicial for the operation of the converter. Indeed, when both switches Q1-Q2 are open, load 31 is directly connected to voltage source 32 through inductors L1-L2 and storage capacitor C (cf. FIG. 3). Voltage spikes can then occur at the terminals of load 31, and of switches Q1-Q2, which may damage them.

The reverse situation, in which both bidirectional switches Q1-Q2 are closed at the same time, is also problematic, since storage capacitor C is then short-circuited, which causes it to discharge. Substantial energy losses then occur.

Bidirectional switches Q1 and Q2 are advantageously designed and/or biased differently to prevent such faulty operation of converter 30. First switch Q1 is preferably controlled by control device 33, whereas bidirectional switch Q2 is configured to switch spontaneously between opening and closing.

First bidirectional switch Q1, represented by FIG. 6A, comprises, for example, two NMOS-type power transistors T11-T12 mounted in series back-to-back. Source electrode S of transistor T11 is connected to source electrode S' of transistor T12. A signal $V_{CMD}$ from the control device is applied simultaneously to gate electrode G of transistor T11 and gate electrode G' of transistor T12, since these are interconnected like source electrodes S and S'. Control signal $V_{CMD}$ controls the rates of operating phases P1-P2, by opening and closing in succession first bidirectional switch Q1. Control signal $V_{CMD}$ is preferably a rectangular signal, duty cycle α of which varies as represented in FIG. 5.

In one preferential embodiment represented by FIG. 6B, second bidirectional switch Q2 comprises two NMOS-type power transistors T21-T22 and two diodes D11-D22 distributed in two branches connected in parallel. Each of the transistors is mounted in series with a diode to constitute one branch of switch Q2.

Transistors T21 and T22, firstly, and diodes D21-D22, secondly, are oriented in contrary directions, in order that currents ($I_2$) of opposite directions can traverse in succession both branches of second switch Q2. For example, source electrode S of transistor T21 is connected to the anode of diode D21, whereas drain electrode D' of transistor T22 is connected to the cathode of diode D22. The cathode of diode D21 is then connected to the anode of diode D22, whereas drain electrode D of transistor T21 is connected to source electrode S' of transistor T22.

Second bidirectional switch Q2 can thus tolerate one of the four possible current and voltage combinations, as can first switch Q1. However, unlike transistors T11-T22 of the latter, transistors T21 and T22 of switch Q2 are biased by two separate signals, $V_{POL1}$ and $V_{POL2}$, also supplied by the control device. Bias signal $V_{POL1}$ is applied to gate electrode G of transistor T21, whereas bias signal $V_{POL2}$ is applied to gate electrode G' of transistor T22.

Transistors T11-T12 of first switch Q1 and/or transistors T21-T22 of second switch Q2 are advantageously transistors of the GaN HEMT type ("High Electron Mobility Transistor"), since this type of transistor has a high switching speed, compatible with the very high chopping frequencies (>50 MHz). For the same reasons, diodes D21 and D22 of bidirectional switch Q2 can also be GaN diodes.

Alternatively, the transistors of switches Q1-Q2 can be silicon-based or silicon carbide-based MOSFET transistors, when the chopping frequency is lower.

Figure 1:
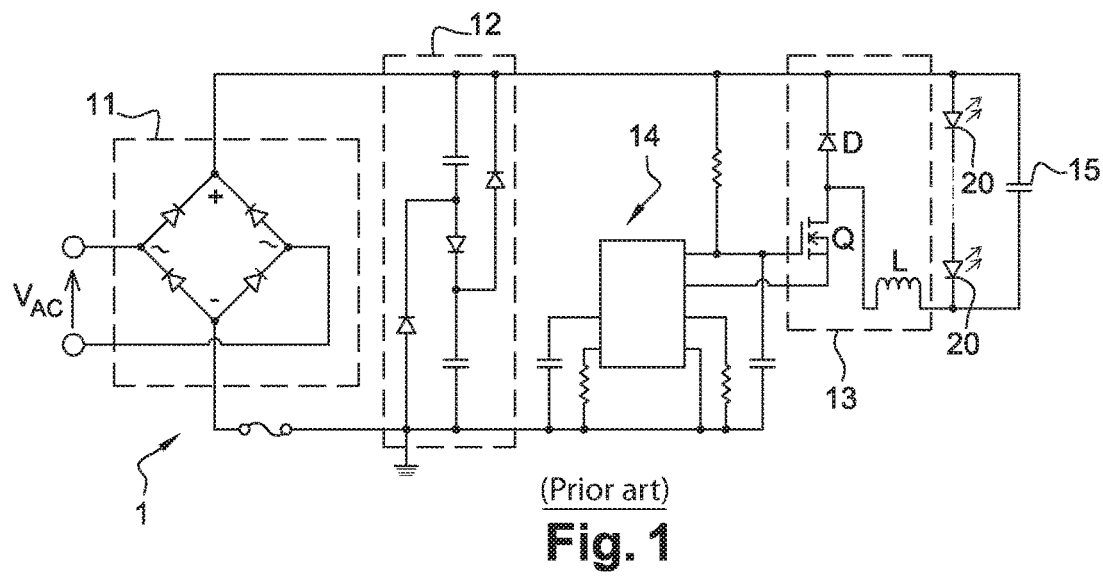
FIG. 1, previously described, schematically represents an LED driver according to the prior art.
Figure 2:
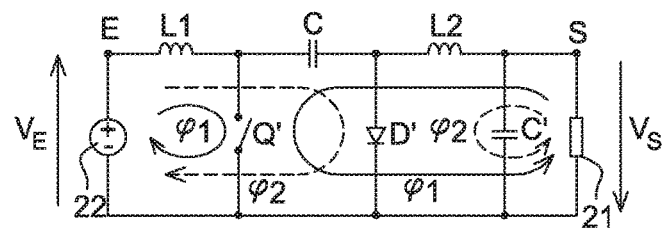
FIG. 2, previously described, schematically represents a DC-DC converter according to the prior art.

By biasing gates G-G' of transistors T21-T22 appropriately, second bidirectional switch Q2 can switch spontaneously to a state opposite that of first switch Q1, and by this means reproduce the characteristics of diode D' used in the DC-DC Ćuk converter of the prior art (FIG. 2). This spontaneous switching occurs immediately (i.e. without dead times) after the controlled switching of switch Q1, during each of the positive or negative alternations of the input voltage.

Figure 8A:
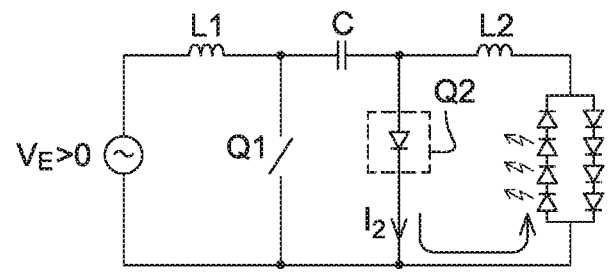
FIG. 8A is an equivalent electrical diagram of the electronic converter according to FIG. 3, during a positive alternation of the input voltage.
Figure 8B:
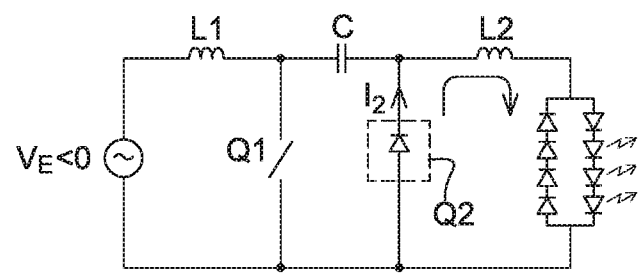
FIG. 8B is an equivalent electrical diagram of the electronic converter according to FIG. 3, during a negative alternation of the input voltage.

FIG. 7 shows, in addition to alternating input voltage $V_E$, the chronograms of control signal $V_{CMD}$ and of bias signals $V_{POL1}$-$V_{POL2}$ of bidirectional switches Q1 and Q2. Besides, FIGS. 8A and 8B represent the equivalent diagram of converter 30 with bidirectional switch Q2 of FIG. 6B, respectively when input voltage $V_E$ is positive and when input voltage $V_E$ is negative.

During chopping of each positive alternation of input voltage $V_E$, transistor T22 of second bidirectional switch Q2 is put into the on-state thanks to a positive voltage $V_{POL2}$ at its gate electrode G (FIG. 7; $V_{POL2}$=Vdd). Conversely, transistor T21 of second bidirectional switch Q2 is in the off-state, since voltage $V_{POL1}$ applied to its gate electrode is zero ($V_{POL1}$=0). Only the branch with transistor T22 is then traversed by current $I_2$, and second bidirectional switch Q2 is to equivalent to diode D22 (FIG. 8A).

Conversely, during chopping of each negative alternation chops, transistor T21 is in the on-state by applying a positive voltage $V_{POL1}$ (FIG. 7; $V_{POL1}$=Vdd), whereas transistor T22 is in the off-state by means of a zero voltage $V_{POL2}$ ($V_{POL2}$=0). Electric current $I_2$ can then traverse only the branch of switch Q2 with transistor T21, and second bidirectional switch Q2 is equivalent to diode D21 (FIG. 8B).

In either of these configurations, switch Q2 closes automatically (i.e. diode D21/D22 is put into the on-state) when switch Q1 opens, and vice versa. This spontaneous switching of switch Q2 is guaranteed, since a diode (D21 or D22 as applicable) is present in the right direction, whatever the sign of input voltage $V_E$ may be. The conventional Ćuk converter, on the contrary, cannot tolerate a change of sign of input voltage $V_E$, since the alignment of diode D' is not interchangeable (cf. FIG. 2). Indeed, since it is designed to operate in DC, not in AC, it has not been equipped a bidirectional switch like the one represented in FIG. 6B, but only with a diode, i.e. a voltage and current unidirectional component.

This way of biasing second bidirectional switch Q2, i.e. through signals $V_{POL1}$ and $V_{POL2}$ of FIG. 7, is simple to implement since bias signals $V_{POL1}$ and $V_{POL2}$ vary at the same frequency F1 as input voltage $V_E$ (for example 50 Hz). Other ways of biasing second bidirectional switch Q2, although less advantageous, could be implemented, with the aim of having spontaneous switching which eliminates dead times.

As previously mentioned, first bidirectional switch Q1 is made to open and close in succession by the control device during each of the positive and negative alternations. This results, in the chronograms of FIG. 7, in a rectangle signal $V_{CMD}$ with a chopping frequency F2 which is much higher than frequency F1 of input voltage $V_E$. For the sake of clarity, the variation of duty cycle α of this rectangular signal is not represented in FIG. 7.

The succession of chopping cycles P1-P2 occurring on each alternation of input voltage $V_E$ is advantageously interrupted by a third operating phase P3, at each transition between a positive alternation and a negative alternation of input voltage $V_E$. This third phase P3 corresponds to a third state of the chopping circuit, in which first bidirectional switch Q1 is made to open ($V_{CMD}$=0) and second bidirectional switch Q2 is made to close ($V_{POL1}$=$V_{POL2}$=Vdd).

Operating phase P3 is called the resonance phase, since alternating voltage source 31 is then connected in series with input inductor L1 and storage capacitor C (cf. FIG. 3), forming a resonant LC circuit.

Figure 9:
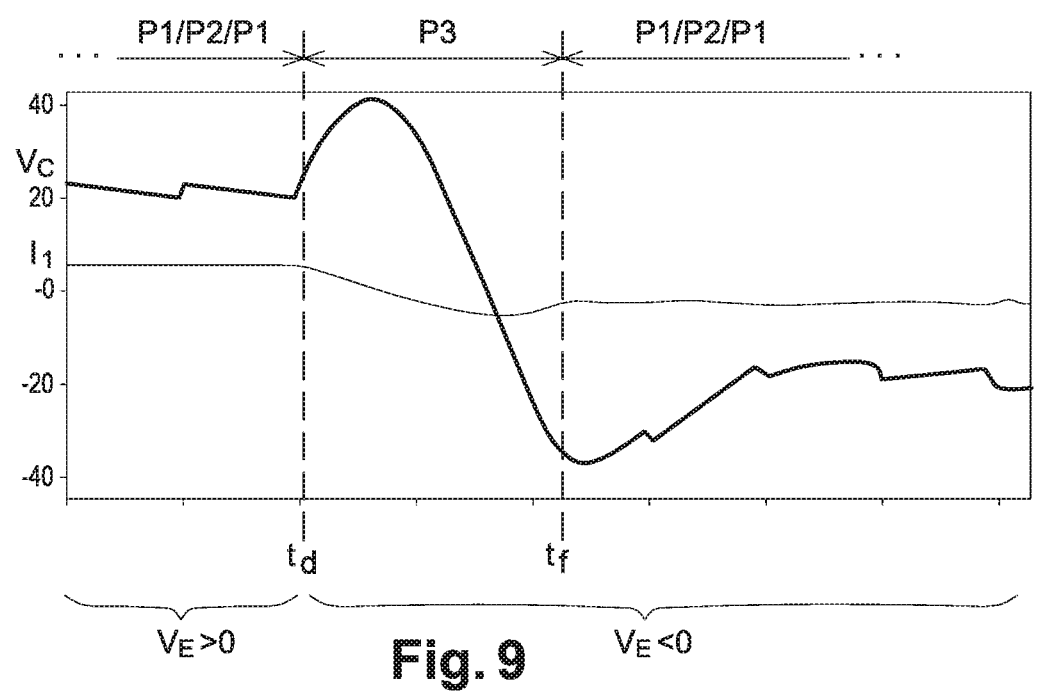
FIG. 9 is a portion of a chronogram showing the behaviour of the electronic converter during transitions between the positive and negative alternations of the input voltage.

FIG. 9, which represents the change of voltage $V_C$ at the terminals of storage capacitor C (cf. FIG. 3) during operating phase P3, shows, indeed, that voltage $V_C$ is positive at the end of a positive alternation of input voltage $V_E$ ($V_E$>0). If a new chopping cycle P1/P2 were to be started with input voltage $V_E$ having become negative ($V_E$<0) and voltage $V_C$ having remained positive, this would cause a short-circuit of storage capacitor C through the branch consisting of diode D21 and transistor T21 (hence $V_C$=0).

Instead, resonance phase P3 enables voltage $V_C$ to be reversed at the terminals of storage capacitor C (and also current $I_1$ in the input inductor to be reversed, cf. FIG. 9), during a change of sign of input voltage $V_E$, by this means preventing a sudden discharge of the capacitor into bidirectional switches Q1 and Q2. This phase P3 can therefore be considered as a synchronisation phase which synchronises all the converter's signals with the change of alternation of the input voltage.

Resonance phase P3 preferably starts at a first instant $t_d$ when alternating input voltage $V_E$ changes to zero (cf. FIGS. 7, 9) and ends at a second instant $t_f$ when voltage $V_C$ measured at the terminals of the storage capacitor reaches a value of opposite sign to the one measured at first instant $t_d$ (FIG. 9). In other words, resonance phase P3 occurs at the very start of each alternation. The value of voltage $V_C$ at second instant $t_f$ is preferably higher in absolute value terms than the nominal voltage of the load. The device controlling switches Q1-Q2 is advantageously provided with a circuit for measuring voltage $V_C$, in order to determine when to initiate and when to interrupt resonance phase P3.

Alternatively, the duration of phase P3 can be predefined. It is preferably equal to a resonance half-period of the LC circuit, i.e. $\pi\sqrt{L1 \cdot C}$.

Figure 10:
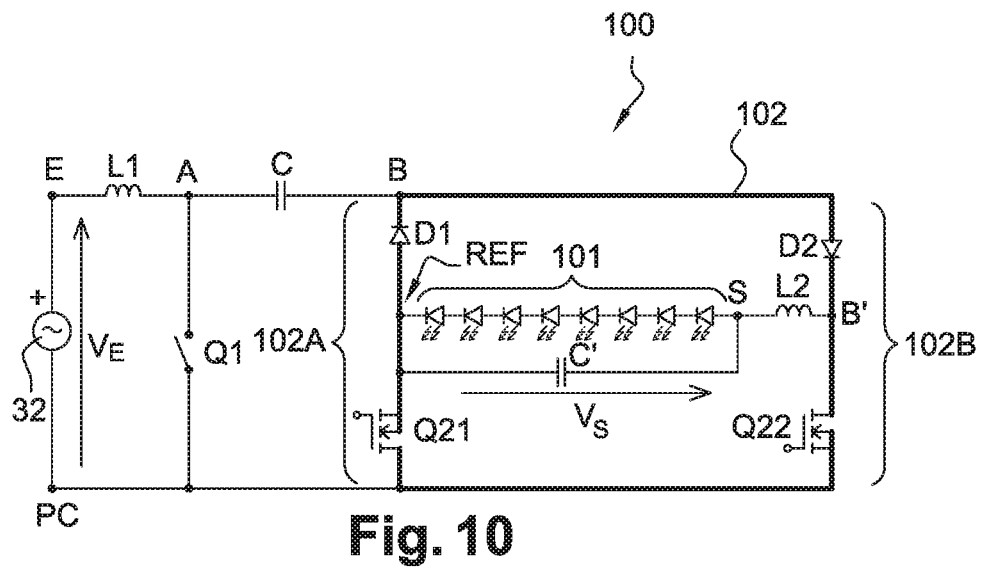
FIG. 10 schematically represents a second embodiment of an AC-DC electronic converter according to the invention.

FIG. 10 is the electrical diagram of an electronic converter 100 according to a second embodiment of the invention.

Unlike converter 30 represented in FIG. 3, converter 100 is coupled to a unidirectional load 101 provided with, for example, a plurality of LEDs connected in series. Unidirectional load 101 is, like bidirectional load 31, connected between output terminal S and reference terminal REF of the converter. Output terminal S forms the point where the current supplied by the converter enters into unidirectional load 101.

Converter 100 comprises the same components as converter 30 of the first embodiment, except for second bidirectional switch Q2. The converter thus comprises an input inductor L1 connected to input terminal E, an output inductor L2 connected to output terminal S, a storage capacitor C arranged between inductors L1 and L2, a first bidirectional switch Q1 and its control device (not represented).

In converter 100, second bidirectional switch Q2 is replaced by a Graetz-type controlled bridge rectifier 102. Its components are distributed in such a way as to direct the current in load 101 in the same direction, whatever the sign of input voltage $V_E$ may be. Thus, all the LEDs of load 101 are used simultaneously. The input of bridge rectifier 102 is connected between node B, to which the second end of storage capacitor C is connected (the first end being connected to input inductor L1), and common terminal PC. In other words, the input of bridge rectifier 102 is located in the place of second bidirectional switch Q2 of FIG. 3. The output of bridge rectifier 102 is located between reference terminal REF and node B', to which the first end of output inductor L2 is connected (the second end being connected to output terminal S). Load 101 and inductor L2 are thus positioned at the output of bridge rectifier 102.

Bridge rectifier 102 comprises four components, including at least two current bidirectional switches, Q21 and Q22. For example, each of switches Q21 and Q22 comprises an NMOS-type power transistor, preferably a GaN HEMT-type transistor. When bridge rectifier 102 comprises only two or three switches the other components are diodes.

In the example represented in FIG. 10, bridge rectifier 102 comprises in a branch 102A a first diode D1 and a first switch Q21. The cathode of diode D1 is connected to storage capacitor C (at node B) and its anode is connected to reference terminal REF. Switch Q21 has a first end connected to reference terminal REF and a second end connected to common terminal PC. Thus, in this embodiment the converter, terminal REF is separated from common terminal PC by first switch Q21.

In the other branch 102B, the bridge rectifier comprises a second diode D2 and a second switch Q22. The anode of diode D2 is connected to the storage capacitor (i.e. to node B) and the cathode is connected to the first end of output inductor L2 (i.e. to node B'). Second switch Q22 has a first end connected to the first end of output inductor L2, and a second end connected to common terminal PC.

Despite these structural differences, converter 100 of FIG. 10 operates in approximately the same manner as converter 30 of FIG. 3. In particular, the same two operating phases P1 and P2 can be distinguished. During almost the entire duration of the positive and negative alternations of input voltage $V_E$, converter 100 alternates between phases P1 and P2 at the chopping frequency.

Figure 11A:
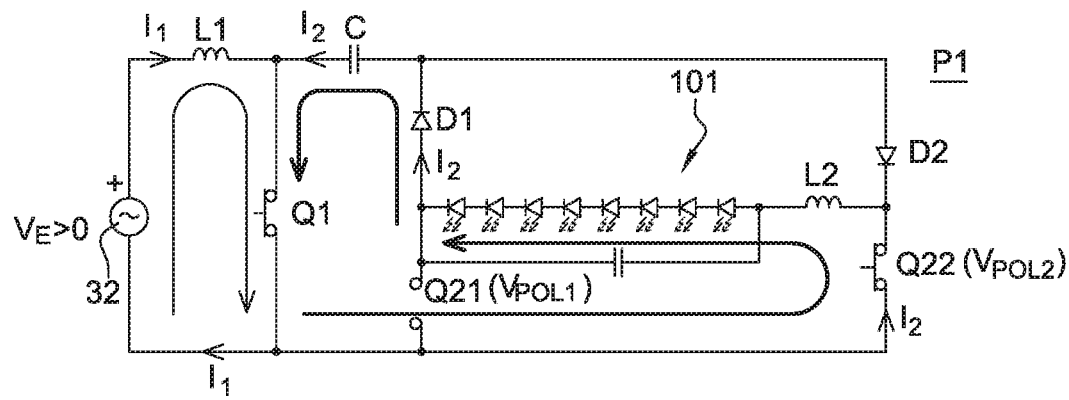
FIGS. 11A and 11B represent two operating phases of the electronic converter according to FIG. 10, during a positive alternation of the input voltage.
Figure 11B:
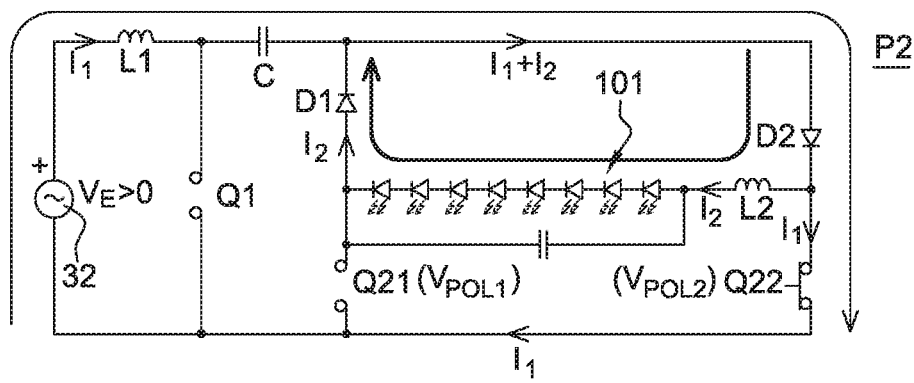
Figure 12A:
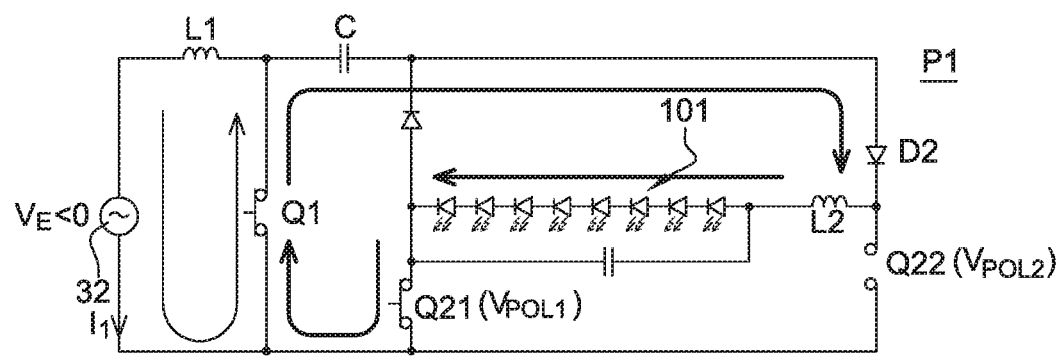
FIGS. 12A and 12B represent the same two operating phases of the electronic converter according to FIG. 10, during a negative alternation of the input voltage.
Figure 12B:
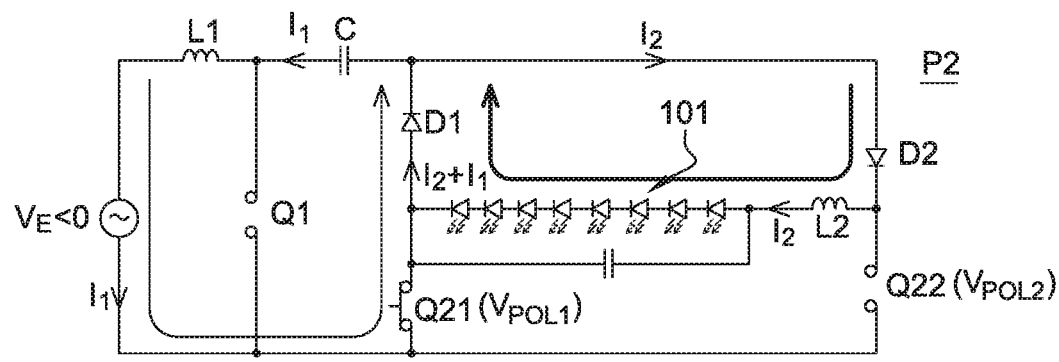

FIGS. 11A and 11B schematically represent converter 100 while input alternating voltage $V_E$ is positive, respectively during first operating phase P1 and during second operating phase P2. FIGS. 12A and 12B show converter 100 during these same phases, but when input alternating voltage $V_E$ is negative.

The control device which controls switches Q1 and Q21-Q22 closes bidirectional switch Q1 during first operating phase P1, whatever the sign of input alternating voltage $V_E$ (FIG. 11A & FIG. 12A) may be. Thus, input inductor L1 becomes charged due to current $I_1$ supplied by voltage source 32. As previously described in relation with FIG. 3, only the direction of current $I_1$ varies, depending on whether first phase P1 occurs during a positive alternation or during a negative alternation of input voltage $V_E$.

However, the configuration of bridge rectifier 102 depends on the sign of input voltage $V_E$. During a positive alternation (FIG. 11A), first switch Q21 is open while second switch Q22 is closed. Conversely, during a negative alternation (FIG. 12A), first switch Q21 is closed while second switch Q22 is open.

In both cases, the effect of controlling bridge rectifier 102 in this manner is to discharge storage capacitor C into output inductor L2, producing current $I_2$ which traverses load 101. However, the path travelled by current $I_2$ is different in the two cases. In the case of FIG. 11A ($V_E > 0$), current $I_2$ traverses in succession bidirectional switch Q1, second transistor Q22 of bridge rectifier 102, output inductor L2, load 101 and first diode D1 of bridge rectifier 102. In the case of FIG. 12A ($V_E < 0$), current $I_2$ traverses in succession second diode D2 of bridge rectifier 102, output inductor L2, load 101, first switch Q21 of bridge rectifier 102 and bidirectional switch Q1.

During operating phase P2 represented in FIGS. 11B and 12B, bidirectional switch Q1 is made to open. Besides, if input voltage $V_E$ is positive (FIG. 11B), first switch Q21 of bridge rectifier 102 is open, while its second switch Q22 is closed. Current $I_1$ from source 32 then traverses a loop comprising input inductor L1, storage capacitor C and second branch 102B of bridge rectifier (diode D2 and switch Q22). Thus, input inductor L1 transfers its charge into storage capacitor C. Simultaneously, the charge contained in output inductor L2 is dissipated while powering the LEDs of load 101. Current $I_2$ supplied by output inductor L2 flows through a loop by traversing load 101 and diodes D1-D2.

If, conversely, input voltage $V_E$ is negative (FIG. 12B), first switch Q21 is closed and second switch Q22 is open. Current $I_1$ then traverses in succession first branch 102A of bridge rectifier (diode D1 and switch Q21), storage capacitor C and input inductor L1 before returning to source 32. Current $I_2$, however, flows in the same way as previously through diodes D21-D22. Thus, the same charge transfers take place between FIGS. 12A and 12B, but through another loop as regards the charge transfer from input inductor L1 to storage capacitor C.

The control signals controlling switches Q1 and Q21-Q22 on each alternation of input voltage $V_E$ are identical to those represented in FIG. 7. Indeed, bidirectional switch Q1 of converter 100 is controlled by signal $V_{CMD}$ at chopping frequency F2 by varying its duty cycle α, as described in relation with FIG. 5. Switches Q21 and Q22 of bridge rectifier 102 are controlled respectively by signals $V_{POL1}$ and $V_{POL2}$. Signal $V_{POL1}$ is zero ($V_{POL1}$=0) during each positive alternation to open first switch Q21 of bridge rectifier 102 (cf. FIGS. 11A-11B), but positive ($V_{POL1}$=Vdd) during each negative alternation to close this same switch Q21 (cf. FIGS. 12A-12B). Conversely, signal $V_{POL2}$ is positive ($V_{POL2}$=Vdd) during each positive alternation to close second switch Q22 of bridge rectifier 102 (cf. FIGS. 11A-11B), but zero ($V_{POL2}$=0) during each negative alternation to open this same switch Q22 (cf. FIGS. 12A-12B).

The rhythm of operating phases P1 and P2 of converter 100 is set by the controlled switching of first switch Q1. Bridge rectifier 102 alternates automatically between the configurations represented in FIGS. 11A-11B and 12A-12B, depending on the electrical potentials in the converter (bearing in mind its bias).

For the same reasons as those mentioned above in relation with FIG. 9, the operation of converter 100 advantageously comprises a resonance phase P3 at each transition between the positive and negative alternations. This resonance phase P3 is activated at the start of each alternation by opening bidirectional switch Q1 and by closing switches Q21 and Q22 of bridge rectifier 102. Voltage source 32 is then connected in series with input inductor L1 and storage capacitor C (cf. FIGS. 11B and 12B).

Thus, during this phase P3, control signals $V_{POL1}$ and $V_{POL2}$ of switches Q21-Q22 are identical to those represented in FIG. 7 for transistors T21-T22 of FIG. 3.

Electronic converter 30 of FIG. 3 and electronic converter 100 of FIG. 10 can each comprise a smoothing capacitor C' connected in parallel with the load. This optional capacitor C' enables the residual current variations which occur ar each transition between the positive and negative alternations to be eliminated. However, since these current variations are brief and of low amplitude, this smoothing capacitor is advantageously of low value, approximately 200 pF (at a chopping frequency of 50 MHz).

Many variants and modifications of the electronic converter according to the invention will appear to those skilled in the art. In particular, bidirectional switches Q1-Q2 and Graetz-type bridge rectifier 102 may be designed differently to obtain the operation described above.

The invention claimed is:

1. An electronic converter allowing power to be transferred from an alternating voltage source, connected between an input terminal and a common terminal, to a load connected between an output terminal and a reference terminal, an alternating voltage having a first frequency and comprising positive alternations alternating with negative alternations, said converter comprising:
    an input inductor having a first end connected to the input terminal so as to receive the alternating voltage;
    an output inductor connected to the output terminal;
    a storage capacitor arranged between the input inductor and the output inductor;
    a chopper circuit configured:
        in a first operating state, to charge the input inductor by means of the alternating voltage source, and to discharge the storage capacitor into the output inductor while powering the load;
        in a second operating state, to discharge the input inductor into the storage capacitor, and to discharge the output inductor while powering the load;
        the chopper circuit comprising a first bidirectional switch having a first end connected to a second end of the input inductor, and a second end connected to the common terminal, and
    a control device for controlling the chopper circuit, configured to activate, during each of the positive and negative alternations, successive operating cycles at a second frequency higher than the first frequency, each operating cycle comprising the first operating state and of the second operating state, the first operating state having a duty cycle which varies so as to obtain a constant output voltage between the output terminal and the reference terminal during each of the positive and negative alternations.

2. The electronic converter according to claim 1, wherein the control device is configured to make the duty cycle vary according to variation directions identical to those of the alternating voltage during each negative alternation and according to variation directions opposite to those of the alternating voltage during each positive alternation.

3. The electronic converter according to claim 1, wherein the control device is configured to make the duty cycle vary periodically at a third frequency equal to twice the first frequency.

4. The electronic converter according to claim 1, wherein the chopper circuit is further configured to connect the input inductor and the storage capacitor in series with the alternating voltage source in a third operating state, and the control device is further configured to activate the third operating state at each transition between the positive and negative alternations.

5. The electronic converter according to claim 4, wherein the control device is further configured to measure α voltage at terminals of the storage capacitor and wherein the third operating state starts roughly at a first instant when the alternating voltage changes to zero and ends at a second instant when the voltage measured at the terminals of storage the capacitor reaches a value of opposite sign to the one measured at the first instant.

6. The electronic converter according to claim 5, wherein the first bidirectional switch comprises first and second transistors mounted in series back-to-back and controlled by a single signal from the control device.

7. The electronic converter according to claim 6, wherein the first and second transistors of the first bidirectional switch are gallium nitride HEMT transistors.

8. The electronic converter according to claim 1, wherein:
    the second end of the input inductor is connected to a first electrode of the storage capacitor,
    the output inductor comprises a first end and a second end connected to the output terminal;
    the chopper circuit further comprises a Graetz-type controlled bridge rectifier having an input connected between a second electrode of the storage capacitor and the common terminal, and an output connected between the reference terminal and the first end of the output inductor.

9. The electronic converter according to claim 8, wherein the Graetz-type controlled bridge rectifier comprises four components including at least two transistors.

10. The electronic converter according to claim 8, wherein the Graetz-type controlled bridge rectifier comprises:
   a first diode having a cathode connected to the second electrode of the storage capacitor, and an anode connected to the reference terminal;
   a first transistor having a first end connected to the reference terminal and a second end connected to the common terminal;
   a second diode having an anode connected to the second electrode of the storage capacitor, and a cathode connected to the first end of the output inductor; and
   a second transistor having a first end connected to the first end of the output inductor, and a second end connected to the common terminal.

11. The electronic converter according to claim 10, wherein:
   the first bidirectional switch is made to open and close in succession by the control device during each of the positive and negative alternations;
   the first transistor is made to open by the control device during each of the positive alternations, and to close during each of the negative alternations;
   the second transistor is made to close by the control device during each of the positive alternations, and to open during each of the negative alternations; and
   the first bidirectional switch is made to open by the control device at each transition between the positive and negative alternations;
   the first and second transistors are made to close by the control device at each transition between the positive and negative alternations.

12. The electronic converter according to claim 1, wherein:
   the reference terminal is connected to the common terminal;
   the second end of the input inductor is connected to a first electrode of the storage capacitor;
   the output inductor comprises a first end connected to a second electrode of the storage capacitor and a second end connected to the output terminal; and wherein the chopper circuit further comprises a second bidirectional switch having a first end connected to the first end of the output inductor, and a second end connected to the common terminal.

13. The electronic converter according to claim 12, wherein:
   the first bidirectional switch is made to open and close in succession by the control device during each of the positive and negative alternations;
   the second bidirectional switch is configured to switch spontaneously between opening and closing during each of the positive and negative alternations;
   the first bidirectional switch is made to open by the control device at each transition between the positive and negative alternations;
   the second bidirectional switch is made to close by the control device at each transition between the positive and negative alternations.

14. The electronic converter according to claim 12, wherein the second bidirectional switch comprises first and second branches connected in parallel, the first branch comprising a first transistor and a first diode connected in series, the second branch comprising a second transistor and a second diode connected in series, and the first and second diodes being mounted in opposite directions.

15. A lighting system comprising:
   an electronic converter according to claim 1; and
   a load provided with at least one LED, connected between the output terminal and the reference terminal of the electronic converter.

16. The lighting system according to claim 15, wherein:
   the load is provided with a series of LEDs, the output terminal of the converter forming a point where the current enters into the series of LEDs;
   the second end of the input inductor is connected to a first electrode of the storage capacitor,
   the output inductor comprises a first end and a second end connected to the output terminal;
   the chopper circuit further comprises a Graetz-type controlled bridge rectifier having an input connected between a second electrode of the storage capacitor and the common terminal, and an output connected between the reference terminal and the first end of the output inductor.

17. The lighting system according to claim 15, wherein:
   the load is provided with two series of LED connected in antiparallel;
   the reference terminal is connected to the common terminal;
   the second end of the input inductor is connected to a first electrode of the storage capacitor;
   the output inductor comprises a first end connected to a second electrode of the storage capacitor and a second end connected to the output terminal; and
   the chopper circuit further comprises a second bidirectional switch having a first end connected to the first end of the output inductor, and a second end connected to the common terminal.

* * * * *